United States Patent
Yuce et al.

(10) Patent No.: US 9,481,455 B2
(45) Date of Patent: Nov. 1, 2016

(54) DUAL SERIES DAMPER SYSTEM

(75) Inventors: Mithat Yuce, Argyle, TX (US); David A. Popelka, Colleyville, TX (US); Frank B. Stamps, Colleyville, TX (US); Mark A. Wiinikka, Hurst, TX (US)

(73) Assignee: Textron Innovations Inc., Providence, RI (US)

( * ) Notice: Subject to any disclaimer, the term of this patent is extended or adjusted under 35 U.S.C. 154(b) by 904 days.

(21) Appl. No.: 13/703,650

(22) PCT Filed: Apr. 26, 2011

(86) PCT No.: PCT/US2011/033956
§ 371 (c)(1),
(2), (4) Date: Dec. 12, 2012

(87) PCT Pub. No.: WO2012/148389
PCT Pub. Date: Nov. 1, 2012

(65) Prior Publication Data
US 2013/0084183 A1    Apr. 4, 2013

(51) Int. Cl.
*B64C 27/51*    (2006.01)
*F16F 13/06*    (2006.01)

(52) U.S. Cl.
CPC ............... *B64C 27/51* (2013.01); *F16F 13/06* (2013.01)

(58) Field of Classification Search
CPC ................................ B64C 27/51; F16F 13/06
See application file for complete search history.

(56) References Cited

U.S. PATENT DOCUMENTS

| 4,105,365 | A |   | 8/1978 | Ferris et al. |
|---|---|---|---|---|
| 5,178,241 | A | * | 1/1993 | Aubry ............ B64C 27/51 188/280 |
| 5,501,434 | A |   | 3/1996 | McGuire |
| 6,045,328 | A |   | 4/2000 | Jones |
| 6,092,795 | A |   | 7/2000 | McGuire |

(Continued)

FOREIGN PATENT DOCUMENTS

| DE | 10001159 A1 | 7/2001 |
|---|---|---|
| FR | 2592696 A1 | 7/1987 |
| WO | 2010129322 A1 | 11/2010 |

OTHER PUBLICATIONS

Extended European Search Report in related European patent application No. 11864375, mailed Nov. 15, 2013, 6 pages.

(Continued)

*Primary Examiner* — Nathaniel Wiehe
*Assistant Examiner* — Cameron Corday
(74) *Attorney, Agent, or Firm* — James E. Walton (57) ABSTRACT

A dual series damper includes a fluid damper portion and a elastomeric damper portion. The fluid damper portion includes a first housing, a first connection member, and a piston coupled to the first connection member. The piston divides an interior of the first housing into a first fluid chamber and a second fluid chamber. The piston has a fluid passage in the piston, the fluid passage being configured to provide fluid communication between the first fluid chamber and the second fluid chamber. The elastomeric damper portion includes a second housing, a second connection member coupled to the second housing, and an elastomer between the first housing and the second housing. When a lead/lag force is introduced to the dual series damper, the fluid damper portion behaves rigidly so that the elastomeric damper portion dampens the lead/lag oscillation.

17 Claims, 7 Drawing Sheets

(56) References Cited

U.S. PATENT DOCUMENTS

| | | | | |
|---|---|---|---|---|
| 8,038,394 B2* | 10/2011 | Stille | ............... | B64C 27/51 |
| | | | | 416/1 |
| 2010/0215496 A1 | 8/2010 | Nannoni et al. | | |
| 2012/0051909 A1* | 3/2012 | McGuire | ............ | F16F 13/08 |
| | | | | 416/1 |

OTHER PUBLICATIONS

International Search Report and Written Opinion issued by the International Searching Authority in related PCT Application No. PCT/US2011/033956, mailed Jul. 18, 2011, 11 pages.

\* cited by examiner

DUAL SERIES DAMPER SYSTEM

TECHNICAL FIELD

The system of the present application relates to a damper for an aircraft. In particular, the system of the present application relates to a lead/lag damper for a rotorcraft.

DESCRIPTION OF THE PRIOR ART

Certain rotorcraft have multi-bladed rotor hub configurations that require lead/lag dampers to compensate for the acceleration and deceleration of each rotor blade about a rotor blade hinge axis. During forward flight of the rotorcraft, unequal drag forces on the advancing and retreating rotor blade positions typically cause oscillating forces that if left untreated, negatively affect the rotorcraft. For example, untreated lead/lag oscillating forces severely limit the life of structural components through fatigue. Furthermore, untreated lead/lag oscillating forces have even been known to cause catastrophic results in a "ground resonance" phenomenon in which the oscillation frequency is similar to the resonant frequency of the aircraft on its landing gear.

Conventionally, lead/lag dampers are used to treat lead/lag oscillatory forces. However, considerably shortcomings in conventional lead/lag dampers remain.

BRIEF DESCRIPTION OF THE DRAWINGS

The novel features believed characteristic of the system of the present application are set forth in the appended claims. However, the system itself, as well as a preferred mode of use, and further objectives and advantages thereof, will best be understood by reference to the following detailed description when read in conjunction with the accompanying drawings, in which the leftmost significant digit(s) in the reference numerals denote(s) the first figure in which the respective reference numerals appear, wherein:

While the system of the present application is susceptible to various modifications and alternative forms, specific embodiments thereof have been shown by way of example in the drawings and are herein described in detail. It should be understood, however, that the description herein of specific embodiments is not intended to limit the method to the particular forms disclosed, but on the contrary, the intention is to cover all modifications, equivalents, and alternatives falling within the spirit and scope of the application as defined by the appended claims.

DESCRIPTION OF THE PREFERRED EMBODIMENT

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
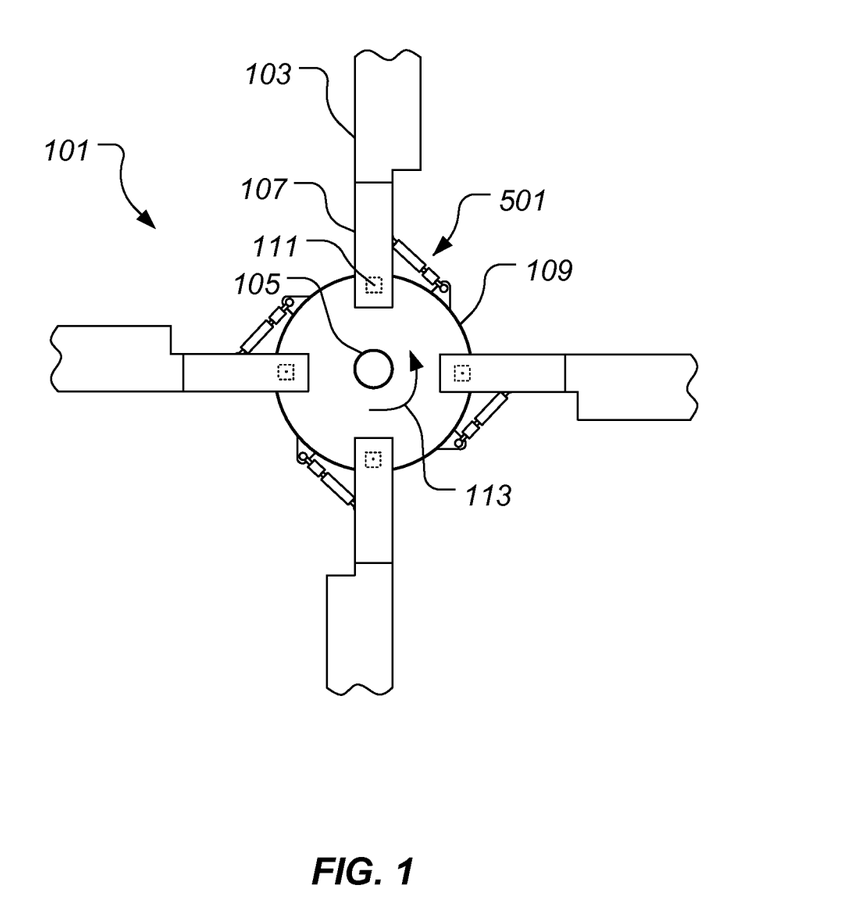
FIG. 1 is a top schematic view of a rotor hub according the preferred embodiment of the present application.

Referring to FIG. 1, a rotor hub 101 for a rotorcraft includes a plurality of rotor blades 103 coupled to a central yoke 109, via a rotor grip 107. Yoke 109 is coupled to a rotor mast 105 such that rotation of rotor mast 105, in a direction 113, causes the yoke 109 and rotor blades 103 to rotate about the rotor mast axis of rotation. The pitch of each rotor blade 103 is selectively controlled in order to selectively control direction, thrust, and lift of the rotorcraft. Each rotor blade 103 is preferably hinged about a hinge axis 111. Hinge axis 111 can be the result of a discreet hinge, or alternatively from a virtual hinge. A dual series damper 501 is coupled between each rotor blade 103 and the rotor yoke 109. Dual series damper 501 is configured to dampen lead/lag oscillations during operation of the rotorcraft, as further described herein. It should be appreciated that the even though rotor hub 101 is illustrated with four rotor blades 103, the system of the present application is equally applicable to rotor hubs having an alternative number of rotor blades 103.

Figure 2:
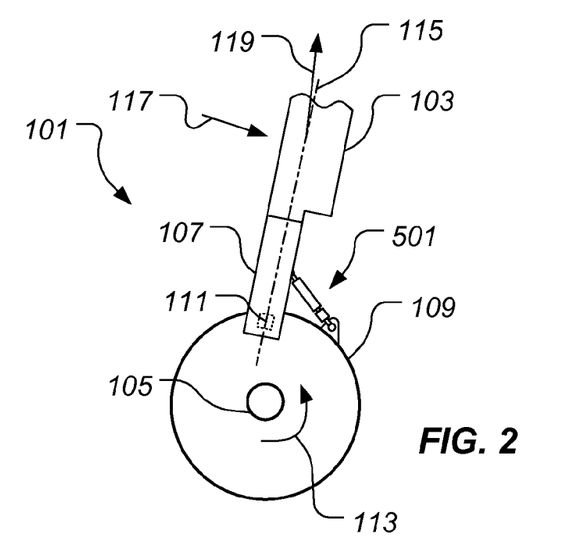
FIG. 2 is a top schematic view of the rotor hub according the preferred embodiment of the present application.

Referring now to FIG. 2, rotor hub 101 is further illustrated. For clarity, only a single rotor blade 103 is shown; however, it should be appreciated that the discussion regarding the rotor blade 103 is equally applicable to other rotor blades 103 that are not shown for clarity. During operation of the rotorcraft, rotor hub 101 is subjected to a variety of aerodynamic forces, as well as mechanical dynamic forces. Rotor hub 101 rotates around the rotor mast axis at approximately 300-350 revolutions per minute (RPM). However, it should appreciated that the rate of rotation of rotor hub 101 is implementation specific; accordingly, the system of the present invention contemplates rotor hubs that rotate at other RPM's as well.

A centrifugal force 119 acts upon rotor blade 103 when rotor blade 103 is rotating around the rotor mast axis. Further, an aerodynamic drag force 117 imparts a restraining force upon the rotor blade 103. The centrifugal force 119 and aerodynamic drag force 117 create moments that act upon rotor blade 103. When the moments from the centrifugal force 119 and aerodynamic drag force 117 are balanced, then the rotor blade 103 is an equilibrium position, such as equilibrium position 115. However, when the centrifugal force 119 and aerodynamic drag force 117 change during operation of the rotorcraft, then a relatively steady force acts on rotor blade 103 until the relatively steady force repositions rotor blade 103 into a new equilibrium position.

Figure 3A:
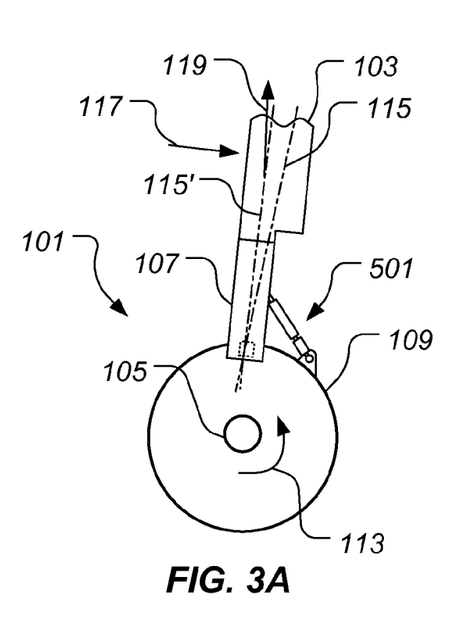
FIGS. 3A and 3B are top schematic views of the rotor hub according the preferred embodiment of the present application.
Figure 3B:
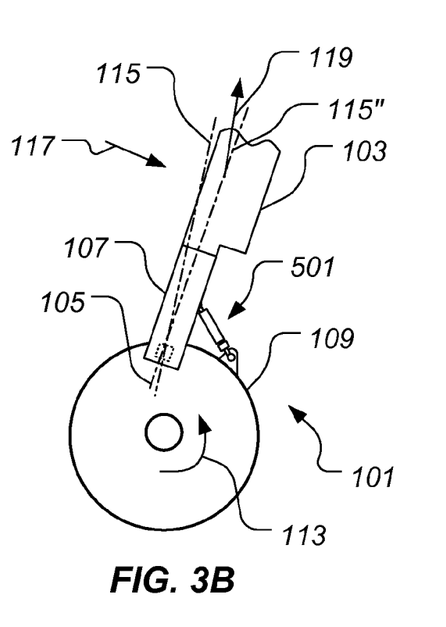

Referring to FIG. 3A, rotor blade 103 is shown in a forward position 115' in which the position of rotor blade 103 has deviated forwardly from equilibrium position 115. Referring also to FIG. 3B, rotor blade 103 is shown in an aft position 115" in which the position of rotor blade 103 has deviated aft of equilibrium position 115. These deviations can be the result of a relatively steady force resulting from a change in the aerodynamic drag or centrifugal force. For example, an increase or decrease in aerodynamic drag can be the result of a change in the pitch angle of the rotor blade 103, thereby causing a steady force to reposition rotor blade 103 to forward position 115' or aft position 115". An increase in pitch angle of rotor blade 103 increases profile drag on the rotor blade 103, whereas a decrease in pitch angle of rotor blade 103 decreases profile drag on the rotor blade 103.

Figure 4A:
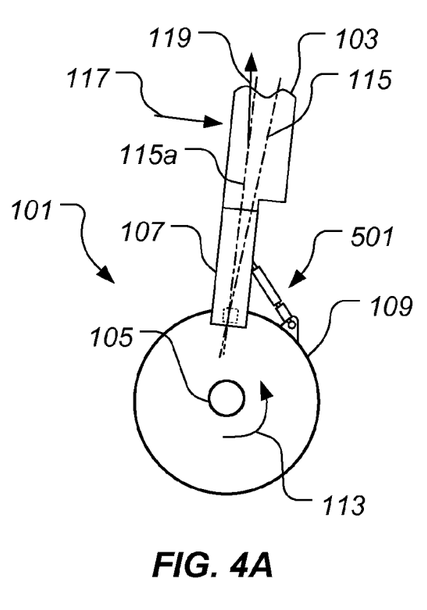
FIGS. 4A and 4B are top schematic views of the rotor hub according the preferred embodiment of the present application.
Figure 4B:
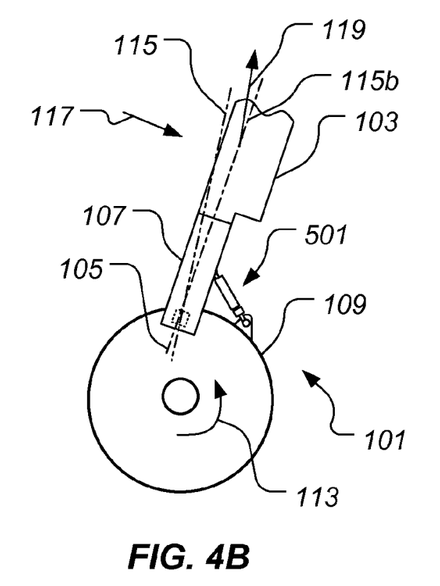
Figure 5:
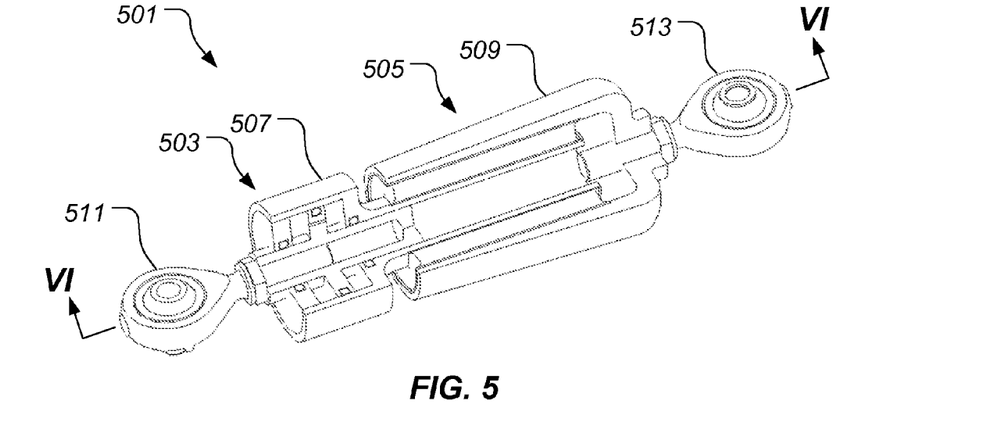
FIG. 5 is a partially removed perspective view of a dual series damper, according to the preferred embodiment of the present application.

Deviations from equilibrium position 115 can be the result of a high frequency oscillatory force acting upon rotor blade 103, such as a lead/lag force. Referring to FIGS. 4A and 4B, the deviation of rotor blade 103 into a forward position 115a or an aft position 115b, can be the result of a lead/lag force that imparts a high frequency oscillatory force facilitating the temporary positioning of rotor blade 103 in forward position 115a or aft position 115b. When airflow resulting from a translation of the rotorcraft, or a wind gust, aligns with a directional position of rotor blade 103, then the temporary decrease in drag acts to accelerate the rotor blade 103 during that rotational phase of the rotor blade 103, resulting in the temporary forward position 115a. In contrast, when the translation airflow direction opposes the directional position of rotor blade 103, then the temporary increase in drag acts to decelerate the rotor blade 103 during that rotation phase of the rotor blade 103, resulting in the temporary aft position 115b. These lead/lag forces act to accelerate and decelerate each rotor blade 103 within a single revolution about the rotor mast 105. As such, these lead/lag forces are high frequency oscillatory forces.

Referring now to FIGS. 5-10, a dual series damper 501, according to the preferred embodiment is illustrated. Dual series damper 501 includes a fluid damper portion 503 and an elastomeric damper portion 505. Fluid damper portion 503 includes a first connection member 511 coupled to a piston 517. The piston 517 acts to divide a cylinder portion of the housing into a first fluid chamber 523 and a second fluid chamber 525, which are in fluid communication via one or more fluid passages 519a and 519b. A fluid 521 is located within first fluid chamber 523 and second fluid chamber 525. Fluid 521 is preferably a hydraulic fluid, but fluid 521 can be a variety of fluid types. Seals 527 and 529, act to prevent fluid 521 from leaking out of the first fluid chamber 523 and second fluid chamber 525. Further, seals 527 and 529 are preferably sliding seals that allow a shaft portion of piston 517 to slide relative to a cylinder portion of first housing 507 while preventing the leakage of fluid 521. A seal 531 creates a sliding seal to keep fluid communication between first fluid chamber 523 and second fluid chamber 525 through fluid passages 519a and 519b.

Dual series damper 501 also includes an elastomeric damper portion 505. Elastomeric damper portion 505 includes a second connection member 513 coupled to a second housing 509. An elastomer portion 515 is coupled to an interior of second housing 509 and to an exterior of a central portion of first housing 507. In one embodiment, elastomer portion 515 is adhesively bonded to the interior of second housing 509 and the exterior of the central portion of first housing 507. It should be appreciated that elastomer portion 515 may have a wide variety of configurations to tailor stiffness and damping properties. For example, one or more openings may be located in and around elastomer portion 515. Furthermore, elastomer portion 515 may be a solid elastomer member or a laminate of elastomer layers. Further, the laminate of elastomeric layers can include cylindrically shaped shims bonded therebetween. Further, the requisite length and thickness of elastomer portion 515 is implementation specific and depends in part on the predicted rotor hub and blade loads. The geometry and composition of elastomer portion 515 may be configured to provide linear or non-linear strain properties.

One of the first connection member 511 and the second connection member 513 is coupled to the rotor yoke 109, while the other of the first connection member 511 and the second connection member 513 is coupled to the rotor grip 107 of rotor blade 103. It should be appreciated that the dual series damper 501 may be associated with the rotor hub 101 in a variety of configurations. Furthermore, dual series damper 501 may alternatively be coupled between adjacent rotor blades 103, instead of being coupled between the rotor blade 103 and rotor yoke 109. In the preferred embodiment, first and second connection members 511 and 513 are rod ends having an integral spherical bearing; however, it should be appreciated that first and second connection members 511 and 513 may be of any configuration capable of providing a structural connection between rotor blade 103 and rotor yoke 109.

The fluid damper portion 503 of dual series damper 501 is configured to be rigid when subjected to a high frequency oscillatory force, such as a lead/lag force. The lead/lag oscillatory forces act to generate an oscillatory lead/lag motion of rotor blade 103 at a lead/lag frequency mode. The elastomer damper portion 505 is to treat both the oscillatory lead/lag motion and the lead/lag frequency mode. The fluid damper portion 503 is configured to be rigid at frequencies of the lead/lag frequency mode and higher, thereby obligating the elastomer damper portion 505 to endure, thus treat oscillatory lead/lag motion and the lead/lag frequency mode. The fluid damper portion 503 accomplishes a rigid reaction to the oscillatory lead/lag motion through the sizing of first housing 507, piston 517, and fluid passages 519a and 519b. For example, when dual series damper 501 is subjected to an oscillatory lead/lag motion, the fluid portion 503 essentially hydrolocks so that the oscillatory lead/lag forces are rigidly transferred between first connection member 511 and first housing 507. The fluid passages 519a and 519b are sized relatively small so that little or no fluid 521 is able to travel through fluid passages 519a and 519b when piston 517 is subjected to a lead/lag oscillatory force. However, when dual series damper 501 is subjected to a steady force, piston 517 translates relative to first housing 507 with the gradual flow of fluid 521 between first fluid chamber 523 and second fluid chamber 525 through fluid passages 519a and 519b.

When dual series damper 501 is subjected to an oscillatory lead/lag motion, thereby producing a rigid reaction from the fluid damper portion 503, the elastomeric damper portion 505 is configured to treat the oscillatory lead/lag motion and the lead/lag frequency mode. More specifically, the spring function of the elastomeric portion 505 is configured to treat the lead/lag mode frequency of the rotor blade 103. For example, the spring function of the elastomeric portion 505 can transform a 1 per revolution lead/lag frequency to a frequency range between 0.4 and 0.75 per revolution. It should be appreciated that the spring constant of the elastomeric portion 505 can be specifically configured to transform the lead/lag frequency into a variety of selected frequencies. Furthermore, the dampening function of the elastomeric portion 505 is configured to dampen the oscillatory lead/lag motion of the rotor blade 103 at the lead/lag mode frequency and higher. Elastomeric portion 505 achieves damping of the lead/lag mode frequencies via shearing deformation of elastomer 515.

Figure 6:
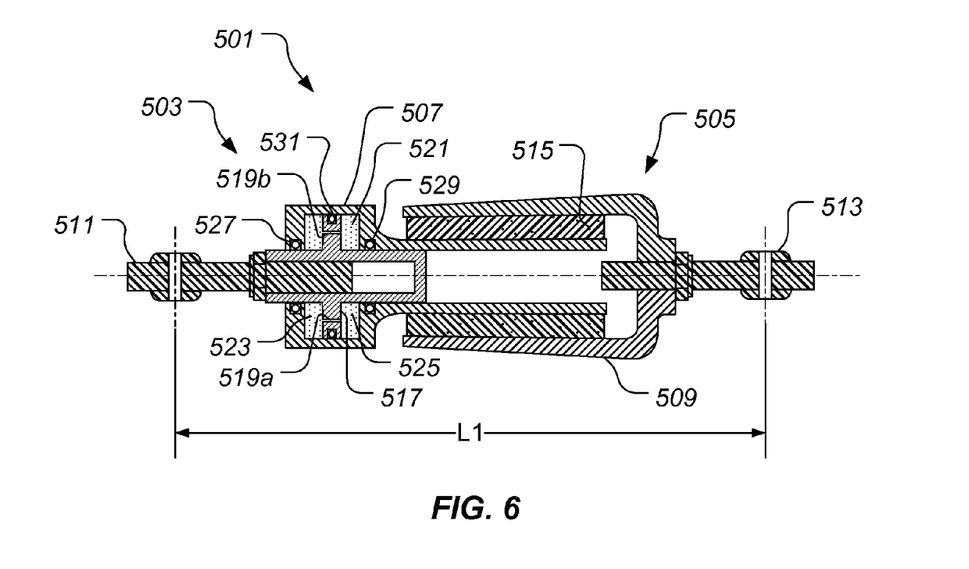
FIG. 6 is a cross-sectional view of the dual series damper, take along section lines VI-VI in FIG. 5, according to the preferred embodiment of the present application.

Referring now to FIG. 6, a length L1 corresponds with a length of dual series damper 501 while rotor blade 103 is in equilibrium position 115. Equilibrium position 115 represents the position of rotor blade 103 in a normal or average position based up predicted flight regimes. As shown in FIG. 6, the fluid damper portion 503 and the elastomeric damper portion 505 are each in a central position. More specifically, piston 517 is located centrally in the cylinder portion of first housing 507, while elastomer 515 is in an undeformed state between the central portion of first housing 507 and second housing 509.

Figure 7:
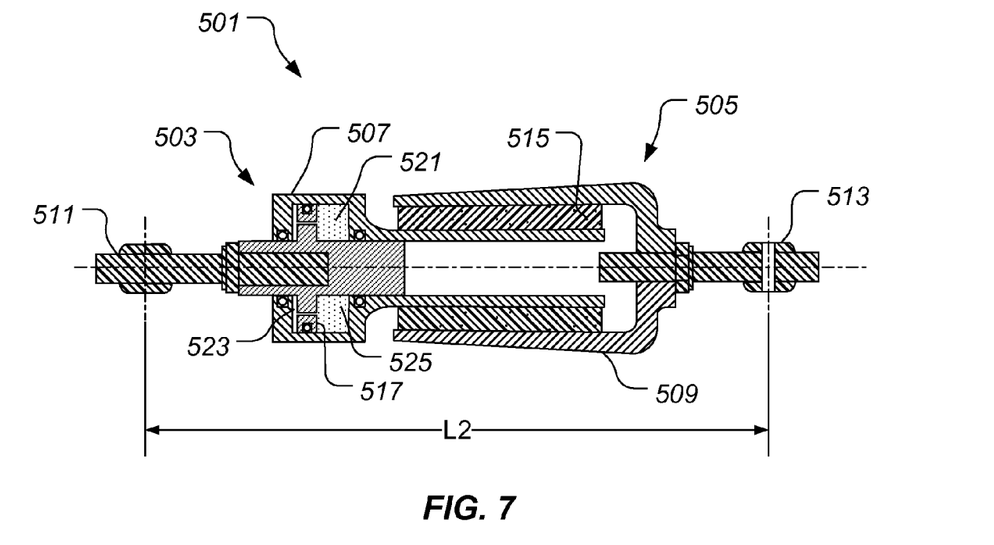
FIG. 7 is a cross-sectional view of the dual series damper, according to the preferred embodiment of the present application.

Referring now to FIG. 7, a length L2 and positioning of fluid damper portion 503 are indicative of dual series damper 501 of being compressed from equilibrium position 115 to aft position 115" as the result of being subjected to a steady force. The steady force acts to translate piston 517 until the fluid pressures in first fluid chamber 523 and second fluid chamber 525 are equalized. The steady force acts on dual series damper 501 to reposition rotor blade 103 from equilibrium portion 115 to aft position 115" so that aft position 115" becomes the new stabilized blade position. Thus, at the aft position 115", the rotor blade 103 is in a new stabilized blade position such that the steady force is zero.

Figure 8:
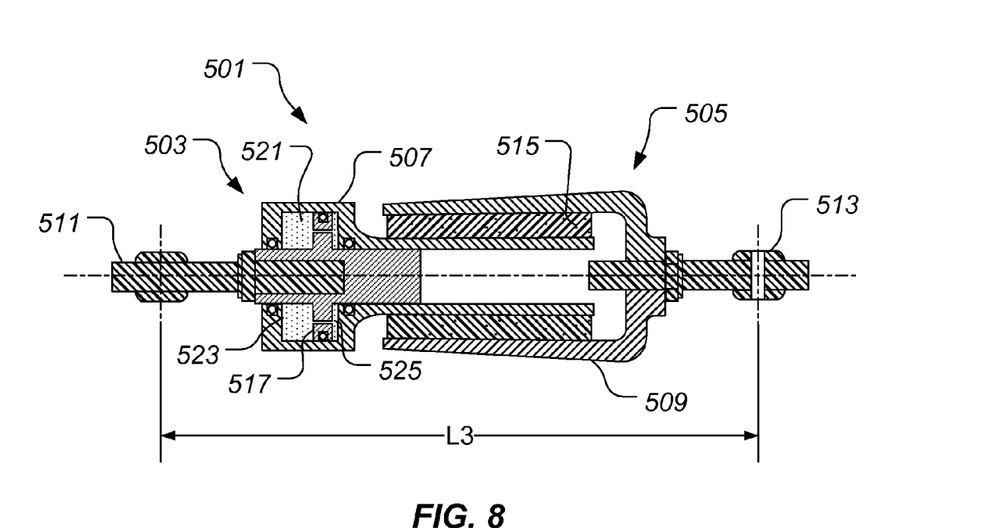
FIG. 8 is a cross-sectional view of the dual series damper, according to the preferred embodiment of the present application.

Referring now to FIG. 8, a length L3 and positioning of fluid damper portion 503 are indicative of dual series damper 501 of being stretched from equilibrium position 115 to forward position 115' as the result of being subjected to a steady force. The steady force acts to translate piston 517 until the fluid pressures in first fluid chamber 523 and second fluid chamber 525 are equalized. The steady force acts on dual series damper 501 to reposition rotor blade 103 from equilibrium position 115 to forward position 115' so that forward position 115' becomes the new stabilized blade position. Thus, at the forward position 115', the rotor blade 103 is in a new stabilized blade position such that the steady force is zero.

As shown in FIGS. 7 and 8, a steady force is fully eliminated by the fluid damper portion 503 of the dual series damper 501. One significant advantage of this feature is that without fluid damper portion 503, the elastomer damper portion 505 would have to endure the steady force. One shortcoming of elastomer material is that it is susceptible to creep, in which a steady force causes continual deflection over time, even when the steady force doesn't change. Furthermore, the magnitude of creep on each elastomer damper may typically be different for each damper on a particular rotor hub. As such, the creep differential on each elastomer damper could cause each rotor blade to be located in different position, thus causing an out-of-position vibration inducing scenario. As such, dual series damper 501 is configured to prevent creep of elastomer 515 by preventing the elastomer damper portion 505 from being subjected to steady forces. Furthermore, dual series damper 501 is configured to passively adjust the length L1 in order to compensate for changes in equilibrium position 115 due to steady forces induced by a change in a flight regime of the rotorcraft. For example, a variable rpm rotorcraft can be configured such that the rotor hub 101 can rotate around the rotor hub 101 at different RPM's. Each rotor hub RPM will typically correspond with a slightly different equilibrium position 115 of the rotor blades 103. Therefore, dual series damper 501 is particularly well suited for variable rpm rotorcraft because the fluid damper portion 503 eliminates the steady forces by changing the damper length, such as damper length L1. Furthermore, this prevents creep induced misalignment of the rotor blades, due to the absence of the steady force, while also preserving elastomer damper portion 505 for treatment of the oscillatory lead/lag motion and the lead/lag frequency mode.

Figure 9:
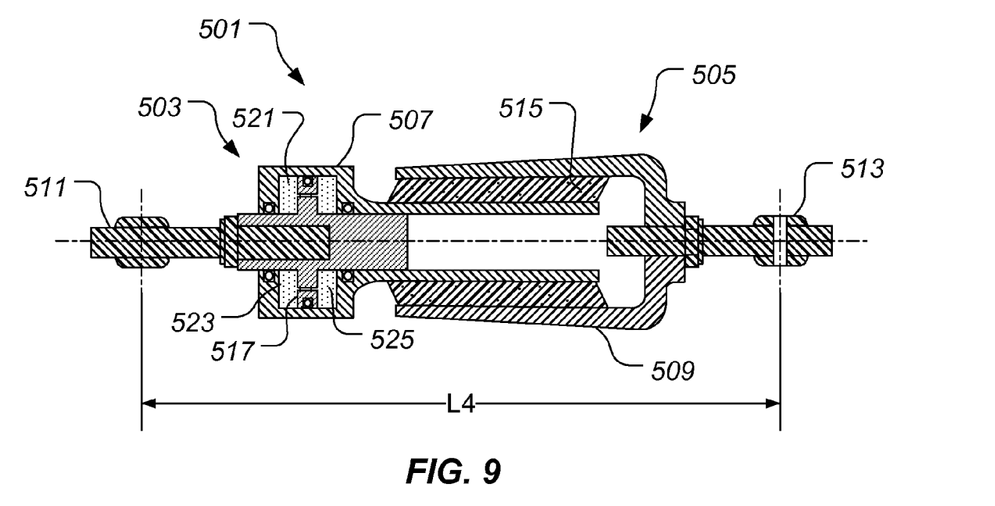
FIG. 9 is a cross-sectional view of the dual series damper, according to the preferred embodiment of the present application.

Referring to FIG. 9, a length L4 and positioning of elastomeric damper portion 505 are indicative of dual series damper 501 being stretched from equilibrium position 115 to forward position 115a as the result of being subjected to a lead/lag oscillatory motion. The lead/lag oscillatory motion acts to translate the central portion of first housing 507 relative to second housing 509, thereby deforming elastomer 515 so as to treat the lead/lag oscillatory motion and the lead/lag frequency mode.

Figure 10:
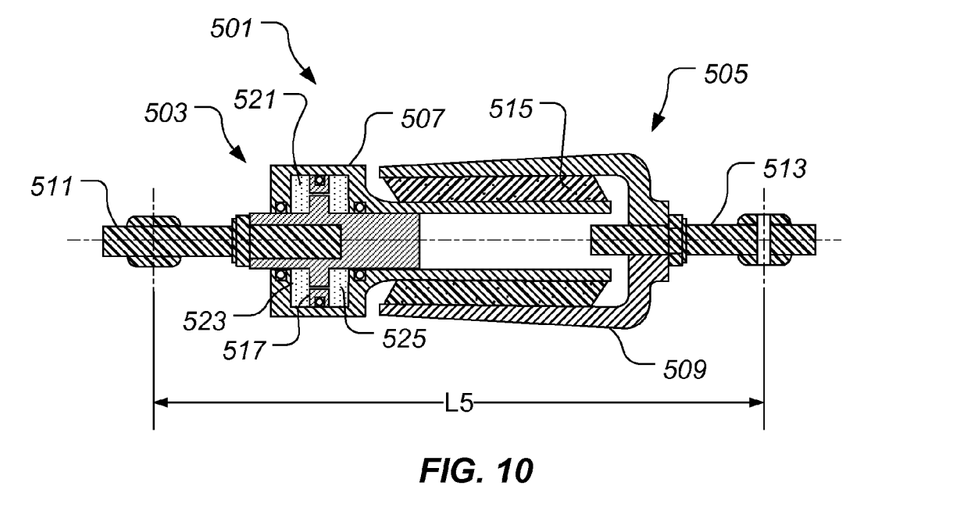
FIG. 10 is a cross-sectional view of the dual series damper, according to the preferred embodiment of the present application.

Referring to FIG. 10, a length L5 and positioning of elastomeric damper portion 505 are indicative of dual series damper 501 being compressed from equilibrium position 115 to aft position 115b as the result of being subjected to a lead/lag oscillatory motion. The lead/lag oscillatory motion acts to translate the central portion of first housing 507 relative to second housing 509, thereby deforming elastomer 515 so as to treat the lead/lag oscillatory motion and the lead/lag frequency mode.

Figure 11:
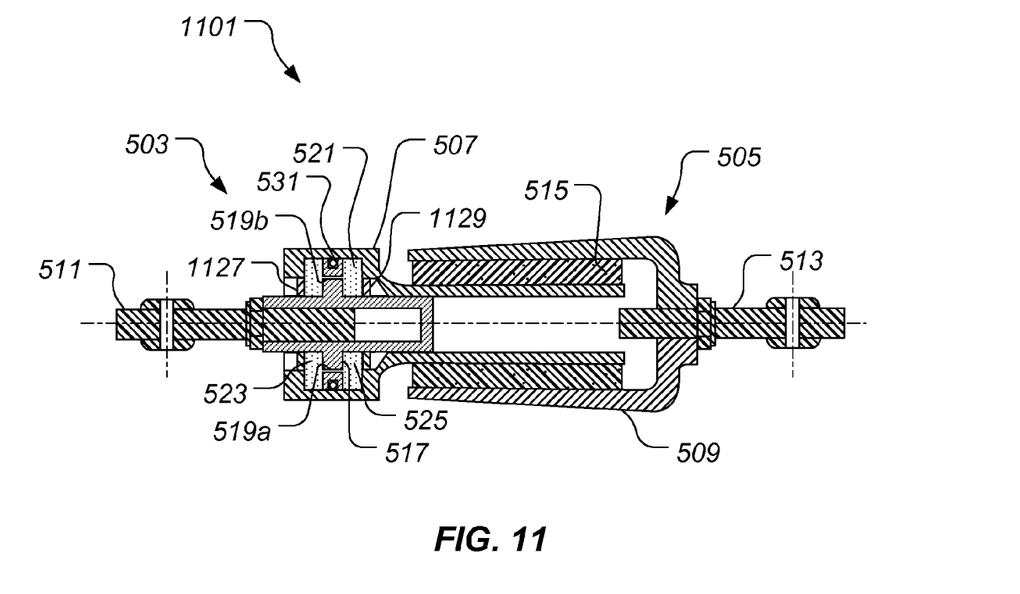
FIG. 11 is a cross-sectional view of a dual series damper, according to an alternative embodiment of the present application.

Referring now to FIG. 11, an alternative embodiment of a dual series damper 1101 is illustrated. Dual series damper 1101 is similar to dual series damper 501 except that sliding seals 527 and 529 are replaced with elastomeric membranes 1127 and 1129, respectively. It should also be appreciated that seal 531 may also be replaced with an elastomeric membrane similar to membranes 1127 and 1129. Membranes 1127 and 1129 are bonded to first housing 507 and piston 511. Deflection of membranes 1127 and 1129 allow piston 511 to translate relative to first housing 507 while preventing undesired leakage of fluid 521. In some implementations of dual series damper 501 and 1101, dual series damper 1101 may be preferred because elastomer membranes may provide better reliability than sliding seals.

Figure 12:
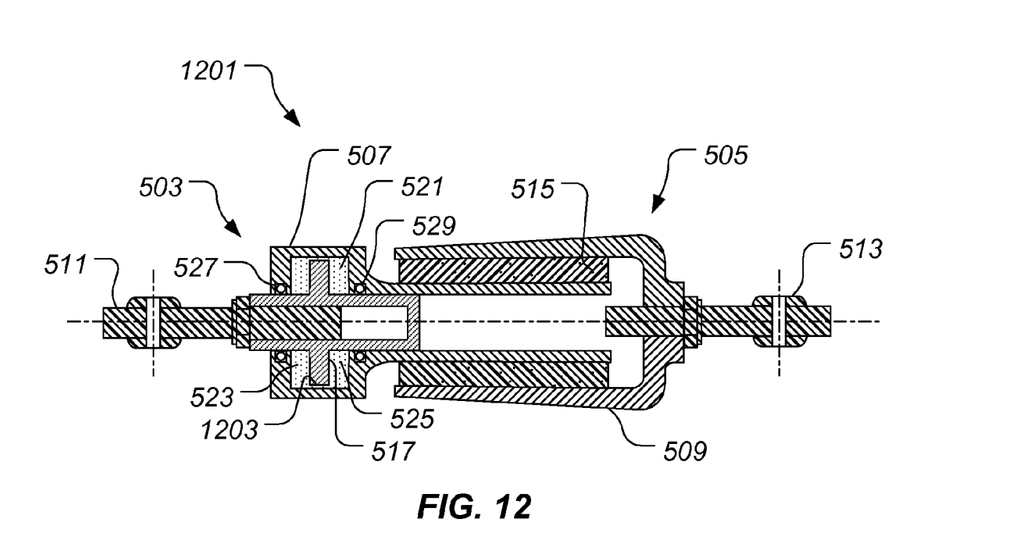
FIG. 12 is a cross-sectional view of a dual series damper, according to an alternative embodiment of the present application.

Referring now to FIG. 12, an alternative embodiment of a dual series damper 1201 is illustrated. Dual series damper 1201 is similar to dual series damper 501 except that sliding seal 531 on piston 517 is not used. Rather, a gap 1203 between a circumferential surface of piston 517 and an interior surface of first housing 507 replaces the fluid passages 519a and 519b of dual series damper 501. As such, gap 1203 functions similar to fluid passages 519a and 519b of dual series damper 501.

The system of the present application provides significant advantages, including: (1) providing a dual series damper that prevents creep of an elastomer, thus increasing rotor blade position uniformity; and (2) providing a dual series damper that passively changes length when subjected to a steady force.

The particular embodiments disclosed above are illustrative only, as the application may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the application. Accordingly, the protection sought herein is as set forth in the claims below. It is apparent that a system with significant advantages has been described and illustrated. Although the system of the present application is shown in a limited number of forms, it is not limited to just these forms, but is amenable to various changes and modifications without departing from the spirit thereof.

The invention claimed is:

1. A dual series damper for a rotorcraft, the dual series damper comprising:
    a fluid damper portion comprising:
        a first housing;
        a first connection member;
        a piston coupled to the first connection member, the piston dividing an interior of the first housing into a first fluid chamber and a second fluid chamber;
        a fluid passage in the piston, the fluid passage being configured to provide fluid communication between the first fluid chamber and the second fluid chamber;
    an elastomeric damper portion comprising:
        a second housing;
        a second connection member coupled to the second housing;
        an elastomer between the first housing and the second housing;
    wherein the elastomeric damper portion moves independently of the fluid damper portion; and
    wherein the fluid damper portion is configured such that the fluid passage allows a fluid to travel between the first fluid chamber and the second fluid chamber when the dual series damper is subjected to a steady force thereby changing a length of the fluid damper portion.

2. The dual series damper according to claim 1, wherein the fluid damper portion is configured to behave rigidly when the dual series damper is subjected to a lead/lag oscillatory force.

3. The dual series damper according to claim 1, wherein the elastomeric damper portion is configured to dampen an oscillatory lead/lag motion and also provide a spring force that adjusts a lead/lag mode frequency to a desired value.

4. The dual series damper according to claim 1, wherein the fluid damper portion is configured to behave rigidly when the dual series damper is subjected to a force occurring at a lead/lag mode frequency.

5. The dual series damper according to claim 1, wherein the dual series damper is configured for attachment between a rotor blade and a rotor yoke.

6. The dual series damper according to claim 1, wherein the dual series damper is configured for attachment between adjacent rotor blades.

7. The dual series damper according to claim 1, wherein the elastomeric damper portion is configured to dampen a lead/lag oscillatory motion and provide spring force to adjust a lead/lag mode frequency, through deflection of the elastomer.

8. A dual series damper for a rotorcraft, the dual series damper comprising:
    a fluid damper portion comprising:
        a first housing having a cylinder portion and a central portion;
        a first connection member;
        a piston coupled to the first connection member, the piston dividing an interior of the cylinder portion of the first housing into a first fluid chamber and a second fluid chamber;
        a fluid passage configured to provide fluid communication between the first fluid chamber and the second fluid chamber;
    an elastomeric damper portion comprising:
        a second housing;
        a second connection member coupled to the second housing;
        an elastomer between the central portion of the first housing and the second housing;
    wherein the elastomeric damper portion is configured to a dampen an oscillatory motion, while the fluid damper portion is configured to eliminate a steady force; the elastomeric damper portion moving independently of the fluid damper portion; and
    wherein the fluid damper portion is configured to passively change the length of the dual series damper when subjected to the steady force.

9. The dual series damper according to claim 8, wherein the oscillatory motion occurs at a lead/lag mode frequency and higher.

10. The dual series damper according to claim 8, wherein the elastomer of the elastomeric damper portion has a stiffness sufficient to treat the oscillatory motion.

11. The dual series damper according to claim 8, the fluid damper portion further comprising:
    a sliding seal between the piston and the cylinder portion of the first housing.

12. The dual series damper according to claim 8, the fluid damper portion further comprising:
    an elastomer seal between the piston and the cylinder portion of the first housing.

13. The dual series damper according to claim 8, wherein the fluid damper portion is configured to passively change the length of the dual series damper when subjected to the steady force through a translation of the piston relative to the cylinder portion of the first housing.

14. A rotor hub for an aircraft, the rotor hub comprising:
    a rotor yoke;
    a plurality of blade grips coupled to the rotor yoke;
    a rotor blade coupled to each blade grip;
    a dual series damper coupled between each blade grip and the rotor yoke, the dual series damper comprising:
        a fluid damper portion comprising:
            a first housing;
            a first connection member;

a piston coupled to the first connection member, the piston dividing an interior of the first housing into a first fluid chamber and a second fluid chamber;

a fluid passage in the piston, the fluid passage being configured to provide fluid communication between the first fluid chamber and the second fluid chamber;

an elastomeric damper portion comprising:
a second housing;
a second connection member coupled to the second housing;
an elastomer between first housing and the second housing;

wherein the elastomeric damper portion moves independently of the fluid damper portion; and wherein the fluid damper portion of the dual series damper is configured such that the fluid passage allows a fluid to travel between the first fluid chamber and the second fluid chamber when the dual series damper is subjected to a steady force thereby changing a length of the fluid damper portion.

15. The rotor hub according to claim 14, wherein the fluid damper portion of the dual series damper is configured to behave rigidly when the dual series damper is subjected to a lead/lag oscillatory force at a lead/lag frequency mode and higher.

16. The rotor hub according to claim 14, wherein the elastomeric damper portion of the dual series damper is configured to dampen a lead/lag oscillation and provide a spring force to a lead/lag frequency mode.

17. The rotor hub according to claim 14, wherein the fluid damper portion behaves rigidly when a lead/lag oscillatory force is introduced to the dual series damper, so that the elastomeric damper portion treats the lead/lag oscillatory force.

* * * * *